(12) United States Patent
Andrews et al.

(10) Patent No.: US 7,711,590 B2
(45) Date of Patent: May 4, 2010

(54) METHODS AND SYSTEMS TO EFFECT COMPREHENSIVE CUSTOMER RELATIONSHIP MANAGEMENT SOLUTIONS

(75) Inventors: Keith Andrews, Victoria (CA); Mary Ballard, San Francisco, CA (US); Dan Braunm, Key West, FL (US); Dan Crowley, San Mateo, CA (US); Sandy Dondici, Sewell, NJ (US); Jennifer Drayton, Oakland, CA (US); Xan Garlick, Ridgefield, CT (US); Paul Green, Canton, GA (US); Krishna Kilambi, Cupertino, CA (US); David Landry, San Francisco, CA (US); Peter Marshall, Irvine, CA (US); Eileen McPartland, Morris Township, NJ (US); Mike Moore, Sonoma, CA (US); Scott Mulder, Wellesley, MA (US); Mike Murphy, Clayton, CA (US); Daniel Poor, Woodbury, CT (US); Michael Resnick, San Carlos, CA (US); Dave Roberts, Atlanta, GA (US); Rick Shaw, Pasadena, CA (US); Scott Springgate, Libertyville, IL (US); Mark Stevens, Atlanta, GA (US); David Svatik, Copper Canyon, TX (US)

(73) Assignee: Siebel Systems, Inc., San Mateo, CA (US)

( * ) Notice: Subject to any disclaimer, the term of this patent is extended or adjusted under 35 U.S.C. 154(b) by 1461 days.

(21) Appl. No.: 11/026,166

(22) Filed: Dec. 31, 2004
(Under 37 CFR 1.47)

(65) Prior Publication Data

US 2007/0174110 A1    Jul. 26, 2007

(51) Int. Cl.
*G06F 17/50* (2006.01)
(52) U.S. Cl. .......................................................... 705/7
(58) Field of Classification Search ...................... 705/7
See application file for complete search history.

(56) References Cited

U.S. PATENT DOCUMENTS

| 6,249,769 B1 * | 6/2001 | Ruffin et al. ................... 705/7 |
| 6,950,802 B1 * | 9/2005 | Barnes et al. .................. 705/7 |
| 2003/0115377 A1 * | 6/2003 | Curtis et al. ................. 709/328 |

OTHER PUBLICATIONS

Chen et al (Integrated management solution architecture), Dec. 2000, IEEE, pp. 1-14.*

* cited by examiner

*Primary Examiner*—Romain Jeanty
(74) *Attorney, Agent, or Firm*—Campbell Stephenson LLP

(57) ABSTRACT

Embodiments of the invention provide methods for effecting a desired business solution. In accordance with one embodiment of the invention, a plurality of aspects of a business are analyzed. Each aspect corresponds to an element of a particular domain of a set of domains wherein the plurality of aspects corresponds to elements from at least two domains. A modification of each element that will result in a desired outcome in regard to the corresponding aspect is determined. In accordance with one embodiment of the invention, the business solution development process identifies and provides exit criteria pertaining to each stage of the business solution development process. For one embodiment of the invention a set of metrics are defined and tracked to measure the effectiveness of the business solution.

30 Claims, 9 Drawing Sheets

METHODS AND SYSTEMS TO EFFECT COMPREHENSIVE CUSTOMER RELATIONSHIP MANAGEMENT SOLUTIONS

FIELD

Embodiments of the invention relate generally to the field of customer management relationship (CRM) business solutions and more particularly to methods and systems to effect a comprehensive CRM solution.

BACKGROUND

A CRM solution, also referred to as a "front office" solution, is an integrated combination of software, process redesign and organization changes applied across an enterprise to enable companies to optimally manage aspects of customer relationships. The purpose of the CRM solution is to provide reliable processes and procedures for interacting with customers. The CRM software application attempts to integrate and automate the various customer-serving processes within a company and typically involves automated processes, personal information gathering and processing, and self-service. A complete CRM solution also addresses the organizational elements of a company that support, motivate and help to manage employees who deal with customers.

A CRM solution typically addresses the general areas of a business including customer service, marketing information, and sales force management. The customer service aspects of the CRM solution automates some service requests, complaints, product returns, and information requests. The marketing aspect of the CRM solution helps companies track current and prospective customers, and automates the marketing campaign development, deployment and analysis functions. The sales force management aspect of the CRM solution automates some of the company's sales and sales force management functions and tracks sales staff performance as well as customer preferences, buying habits, and demographics.

Typically, a CRM solution encompasses all or most of the following technical functionality. CRM applications generally implement centralized data storage (e.g., a central database) so that all relevant customer interaction information can be easily stored and accessed. Most CRM solutions are scalable so that they can be implemented on a desired scale and reliably expanded as needed. CRM solutions usually implement multiple communication channels to provide the ability to communicate with and between customers and organizations employing over a variety of communications media. CRM solutions typically address the issue of workflow and provide the ability to automatically route work through the system to different people based on their roles within the company or other specified criteria.

CRM solutions can improve customer service and customer relations. For example, CRM solutions can improve customer service and customer relations by facilitating communication in a variety of ways including providing product information, product use information, and technical assistance on web sites for greater accessibility. CRM solutions can be used to identify and address customer complaints or potential problems, obtain customer feedback, and track customer interests, as well as to schedule customer interaction such as sales presentation or product maintenance and repair. Moreover, CRM solutions can be integrated into other cross-functional systems and thereby provide accounting and production information to customers or customer-facing employees when needed.

When any of these technology driven improvements in customer service, noted above, contribute to long-term customer satisfaction, they can ensure repeat purchases, improve customer relationships, increase customer loyalty, decrease customer turnover, decrease marketing costs (associated with customer acquisition), and increase sales revenue, thereby increasing profit margins.

As an example, a CRM solution may be applied to a company call center. A call center is a centralized office of a company that responds to customer communications. A call center typically includes a number of work stations that include digital processing systems (DPSs), telephones, and other communication or data storage devices. Many call centers use CRM software to store all of their customers' details. When a customer calls, the system can be used to retrieve and store information relevant to the customer. By serving the customer quickly and efficiently, and also by keeping all information pertaining to a customer in one place, a company realizes cost savings, improves customer satisfaction, and also encourages repeat purchases from current customers.

CRM solutions can also be used to allow customers to perform their own service via a variety of communication channels. For example, a customer may be able to check their account on-line, without interaction with company personnel, thereby saving time and associated costs.

The process through which CRM solutions are currently developed has serious disadvantages. A serious drawback in the way CRM solutions are currently developed is that the CRM solution developer, typically knows very little about the business for which the CRM solution is being developed. The developer merely offers various software alternatives in an attempt to meet the company's technical needs. Another disadvantage of current CRM solution development processes is that CRM solution developers employ a two-part process addressing the technological aspects of the CRM solution.

The first part of the development process involves defining the technological requirements and determining suitable technology to address those requirements. Typically the technology employed is selected from whatever known CRM solution developers have to offer, as is, or with modification. The second part of the development process involves creating and deploying the determined technology. The disadvantage with this approach is that no consideration is given to the current organizational or process effectiveness of the company as they relate to the proposed technology changes. This is especially disadvantageous in that technological deficiencies are rarely the sole or even major point of failure of CRM solutions. Therefore, adding technological improvements may only serve to increase costs without providing a corresponding benefit. For example, consider a company that currently out-sources its marketing functions to a vendor that provides all of its data gathering, data cleansing and data storage needs, as well as creating and deploying marketing programs. If the company decides to take the marketing function in-house, a typical CRM solution would be to design and install marketing software. Such an approach will not address the personnel and process issues that have to be addressed before cost savings can be realized.

Still another disadvantage of current CRM solution development processes is that typical conventional CRM solutions do not identify and track measurements of success (metrics). There is, therefore, no way to confirm that the CRM solution has accomplished the business goals of the company.

SUMMARY

Embodiments of the invention provide methods for effecting a desired business solution. In accordance with one embodiment of the invention, a plurality of aspects of a business are analyzed. Each aspect corresponds to an element of a particular domain of a set of domains wherein the plurality of aspects corresponds to elements from at least two domains. A modification of each element that will result in a desired outcome in regard to the corresponding aspect is determined. Each of the determined modifications is then implemented to effect a desired business solution.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

Embodiments of the invention provide methods and systems for effecting a comprehensive CRM solution. In accordance with one embodiment of the invention, a CRM solution development process encompasses a definition and design stage as well as a build and deliver stage, each of which addresses CRM solution elements where each element represents a distinct aspect of a particular company or organization. For one such embodiment, multiple domains correspond to technology, people, and process aspects of the company or organization. For one embodiment of the invention, the CRM solution identifies and provides exit criteria pertaining to each stage of the CRM solution development process. For one embodiment of the invention a set of metrics are defined and tracked to measure the effectiveness of the CRM solution.

For one embodiment of the invention, one or more stages that precede the definition and design stage are included in the CRM solution development process.

For one embodiment of the invention, one or more stages subsequent to the build and deliver stage are included in the CPM solution development process. For one embodiment of the invention, a post-delivery confirm operation provides verification of the deployed CRM solution. For one embodiment of the invention, a post-delivery operate and optimize operation allows for dynamic evolution of the CRM solution to address the emergence of new technologies, competitive threats, and best practices during implementation of the CRM solution.

In the following description, numerous specific details are set forth. However, it is understood that embodiments of the invention may be practiced without these specific details. In other instances, well-known structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Solution Development Process

Multiple Domain Process

Figure 1:
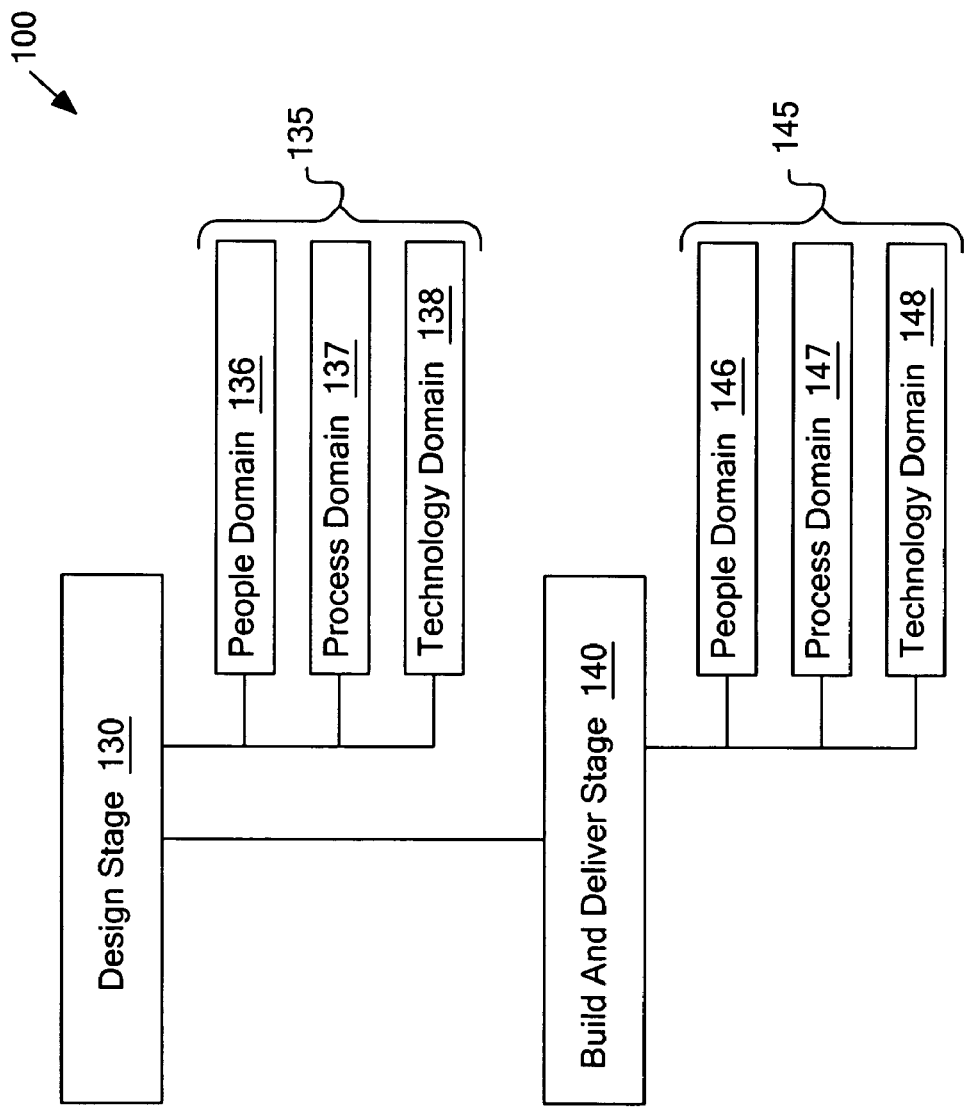
FIG. 1 illustrates a CRM solution development process addressing multiple domains in accordance with one embodiment of the invention.

FIG. 1 illustrates a CRM solution development process addressing CRM solution elements from multiple domains in accordance with one embodiment of the invention. Process 100, shown in FIG. 1, includes operation 130 in which the CRM solution is designed and operation 140 in which the CRM solution is built based upon the design of operation 130, and delivered. Each stage of the CRM solution, the design stage and the build and deliver stage are effected in regard to a domain set including multiple domains each of which contain elements corresponding to aspects of the company. For one embodiment of the invention the domain set includes a people domain, a process domain, and a technology domain.

People Domain

The people domain includes elements corresponding to those aspects of the company related to its people which may include organizational structure, culture, and performance management. Organization structure may include the company hierarchy, management structure, employee roles, responsibilities, and accountability, as well as metrics. The culture includes personal values, morale, and ability to adapt and align to organizational strategy. The performance management includes skills base, training, evaluation, incentives, and succession planning. Other people domain aspects of a company may include language and geographic related concerns.

Process Domain

The process domain is made up of all of the various front office procedures and processes including the marketing, sales, and customer service processes. For example, a process may be a new account set-up process which would include all of the steps in setting up a new account. The process domain includes elements corresponding to such aspects as determining how front office processes are created or modified and which people are responsible for creating or modifying the processes. The process domain also includes process information requirements. That is, because processes typically consume information and produce corresponding information, it is important to determine the information required by each process. Another element of the process domain is the responsibility for the process, that is, identifying who determines if the process is effective and how process effectiveness is measured. A further consideration within the process domain is ensuring that new processes or changes to processes are consistent with other aspects of the business including regulatory compliance and marketing sales, service partners and analytics.

Technology Domain

The technology domain includes elements corresponding to all aspects of the company that facilitate the effective performance of the processes. The technology domain, therefore, includes software architecture that encompasses infrastructure, integration standards, legacy applications, and other technology. Data, including the quality maintenance, control, and manipulation of pertinent data is likewise included in the technology domain. User support is also within the technology domain and comprises the capabilities to train and support end users including ensuring that people can effectively use the technology.

The designation of some aspects of a company as being included within a particular domain is exemplary. In various alternative embodiments of the invention, a particular aspect of a company, including those mentioned above, may be designated in different domains and may overlap more than one domain.

As shown in FIG. 1, operation 130 is effected in regard to domain set 135, which includes people domain 136, process domain 137, and technology domain 138. The result of operation 130 will be a determination of modifications, including additions, deletions, and alterations/transformations within each domain to effect the desired CRM solution. For example, consider a desired CRM solution to automate a sales force having established people and process aspects, with no applied technology. The result of the design operation 130 will include, with respect to the technology domain, a determination of the technology to be applied as well as the modifications to the people and process aspects of the sales force, with respect to the people domain and the process domain, respectively, to efficiently and effectively implement the determined technology. For example, implementing the determined technology may require people changes in terms of number of people, the roles and responsibilities of various people, as well as other elements within the people domain. Process changes would also likely be required due to the automation the technology provides. For example, in light of new technology, the number of operations within a process may change as well as how the process is accomplished and who accomplishes it.

For one embodiment of the invention, modifications of elements in each domain may be selected from a list of available modifications to attain a desired outcome in regard to the corresponding aspect, such that upon implementation of the each of the selected modifications a desired CRM solution is effected.

Operation 140, described in more detail below, is likewise effected in regard to a set of domains 145 including a people domain 146, process domain 147, and technology domain 148. For example, an element of the CRM solution development process within the people domain 146 is ensuring sufficient people with the skills necessary to use the deployed technology. The technology may result in the elimination of one or more processes impacting the process domain 147. Moreover, using the deployed technology may require training and/or technical support further impacting the technology domain 148.

Thus, an embodiment of the invention expands the two-stage CRM solution development process of the prior art to address CRM solution elements from multiple domains corresponding to the people, process and technology aspects of the company. Thoroughly addressing the CRM solution elements within the people and process domains, in addition to those in the technology domain, results in a more effective and efficient CRM solution.

Pre-Definition Stages

For alternative embodiments of the invention, the CRM solution can be made even more relevant and effective through the addition to the development process of preliminary stages that help the developer understand the company in relation to the overall industry and envision the characteristics of a desirable future state of the company.

Figure 2:
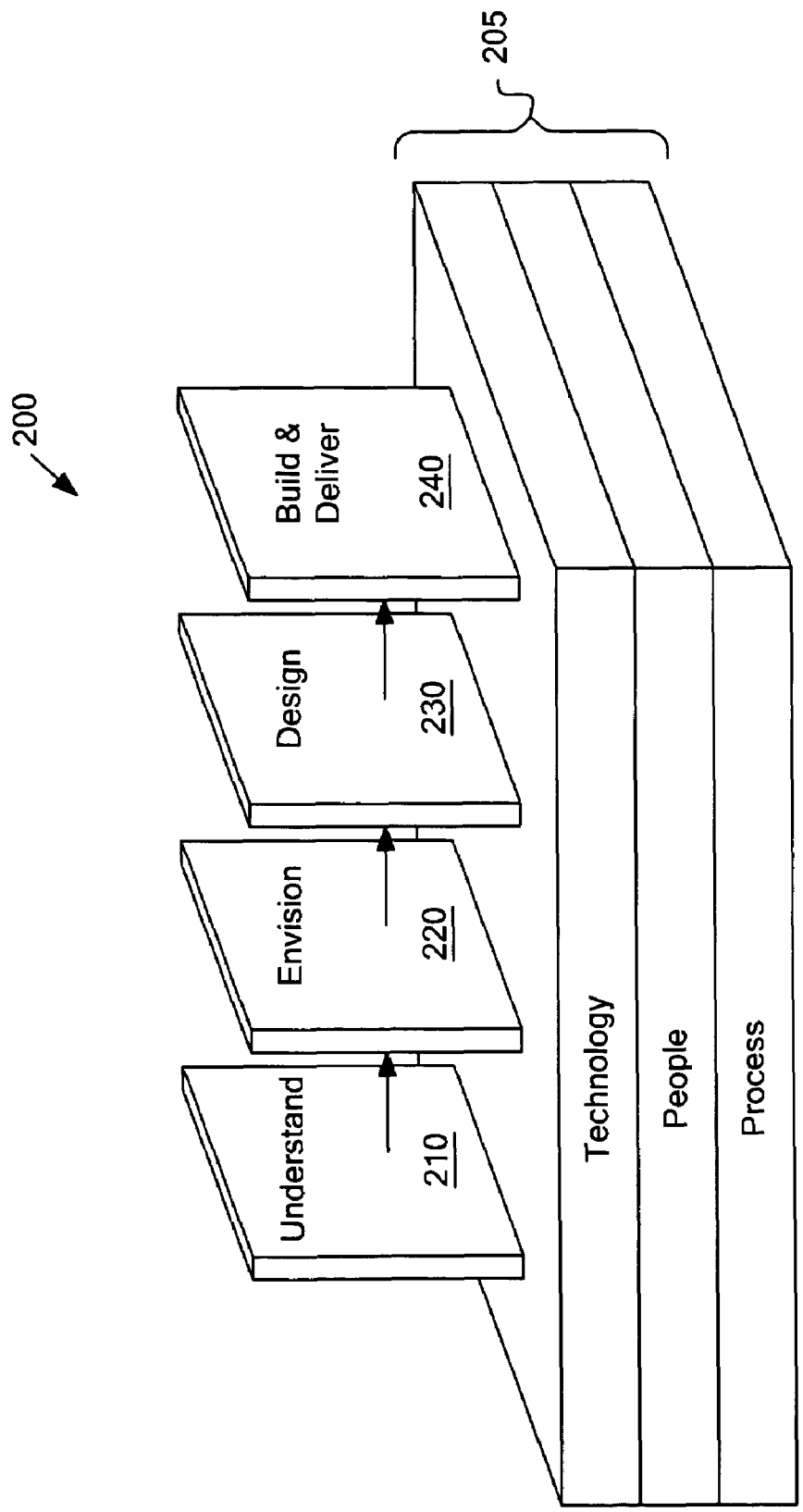
FIG. 2 illustrates a CRM solution development process implementing one or more pre-definition stages in accordance with one embodiment of the invention.

FIG. 2 illustrates a CRM solution development process implementing one or more pre-definition stages in accordance with one embodiment of the invention.

As depicted in FIG. 2, the CRM solution development process 200 includes two pre-definition operations, namely understand operation 210 and envision operation 220, as well as a design operation 230 and a build and deliver operation 240. Alternative embodiments of the invention may implement only one of the pre-definition operations depending on a number of factors including the CRM solution budget or deployment schedule.

Each operation of a CRM solution development process implementing pre-definition processes may address technology domain elements as well as elements from the people domain and the process domain as exemplified by domain set 205.

The pre-definition operations of the CRM solution development process 200 (i.e., the understand operation 210 and the envision operation 220) serve to enhance the relevance of the subsequent design operation 230 and the build and deliver operation 240, as more fully discussed below.

The goal of the understand operation 210 is to provide an independent perspective of a company's strengths, weaknesses, and opportunities for improvement. To achieve this goal comparative benchmarking may be employed to provide an understanding of the company's position within the relevant industry. This allows the CRM solution developer to achieve an understanding of the company that encompasses a knowledge of critical success factors, the company's position within the industry, strategies, processes, organizational structure, technology, relevant metrics (including financial and customer satisfaction metrics), as well as other business concerns and needs. The CRM solution developer can then determine the various aspects of the company in regard to people, processes, and technology, that the company wants to change.

Developing this understanding of not only the problems and issues within the industry, but also what is generally required to effect a desired transformation of a company, allows the CRM solution developer to produce a more effective CRM solution and instills confidence in potential customer companies (companies seeking CRM solutions).

For one embodiment of the invention, some or all of the operations of a CRM solution development process have an associated exit criteria and or deliverable. In accordance with various embodiments of the invention, each of the associated exit criteria and deliverables may address elements from multiple domains.

For one embodiment the exit criteria associated with the understand operation may be that the CRM solution developer has attained a baseline understanding of the company's business and needs as determined by the company (i.e., company representatives). Associated deliverables may include baseline metrics, an analysis of the company's current position, and a high-level opportunity analysis comparing costs and risks with potential benefit.

The goal of the envision operation 220 is to develop a standard for the future state of the company from the perspective of the relevant company management and executives, and to identify modifications to the various domain elements that will transform the company to the envisioned state. For example, a company may envision a future state in which the sales force is automated providing accurate sales and revenue forecast, minimal administrative burden, and state-of-the-art communication and information access resources. Accompanying metrics may also be envisioned, for example, implementing an automated sales force may be envisioned as resulting in increased sales, revenue, and margins, respectively, by some predicted amount.

In general the envisioned future state of the company may identify metrics and business outcomes, desired customer experience, and a modeling of the financial benefits and business across organizations.

The envision operation 220 provides benefits to the company and the CRM solution developer. The envision operation allows the company to formulate desired outcomes and identify the required resources and modifications necessary to the people, process, and technology aspects of the company, to achieve the desired outcomes. The envision operation 220 allows the company to define the desired company transformation so that it is broad enough to effect the desired results, but narrow enough to be practically implemented. Such well-defined transformation is more likely to obtain the necessary support from company management and executives and thus has a greater likelihood of being implemented. Through the envision operation 220, the view the company has of the CRM solution developer often transitions from that of vendor to that of partner. This transition, likewise, increases the likelihood of the transformations being implemented. Also, a well-developed vision is more apt to be viewed as a strategic discussion and implementation decisions may, therefore, be elevated for sponsorship by executive management, thereby avoiding various barriers to implementation, such as lower-level company decision making by purchasing employees and others.

As noted above the envisioning operation provides metrics to help gauge the successful transformation to the envisioned state. Such metrics may include profits, return on investment, total cost of ownership, net margin improvement, net revenue improvement, cash flow improvement, and market share improvement. Each of these high-level metrics can then be decomposed into focused metrics that are more relevant to a particular area of the company for which a transformation to a desired outcome is envisioned.

The goal of the design operation 230 is to provide a detailed description of the modifications to various aspects of the company to facilitate the desired outcomes identified in the envision operation 220. The detailed description includes solution and design details, integration of the design to the overall infrastructure, and organizational alignment to each of the desired outcomes. For one embodiment of the invention the detailed description should address elements from multiple domains of domain set 205 as discussed above.

The end result of the design operation 230 is a detailed solution meeting cost and organizational constraints that meet the approval of relevant company management and executives.

For one embodiment of the invention in which the CRM solution development process implements a pre-definition envision operation, each of the desired outcomes envisioned, are mapped to the specific people, processes, and technology creating a logical map between outcomes and the required resources for effecting the desired outcomes. That is, the high-level goals identified in the envision operation 220 are decomposed to specific, measurable, outcomes and the outcomes are mapped to the transformation of elements necessary to achieve the desired outcome.

Figure 3:
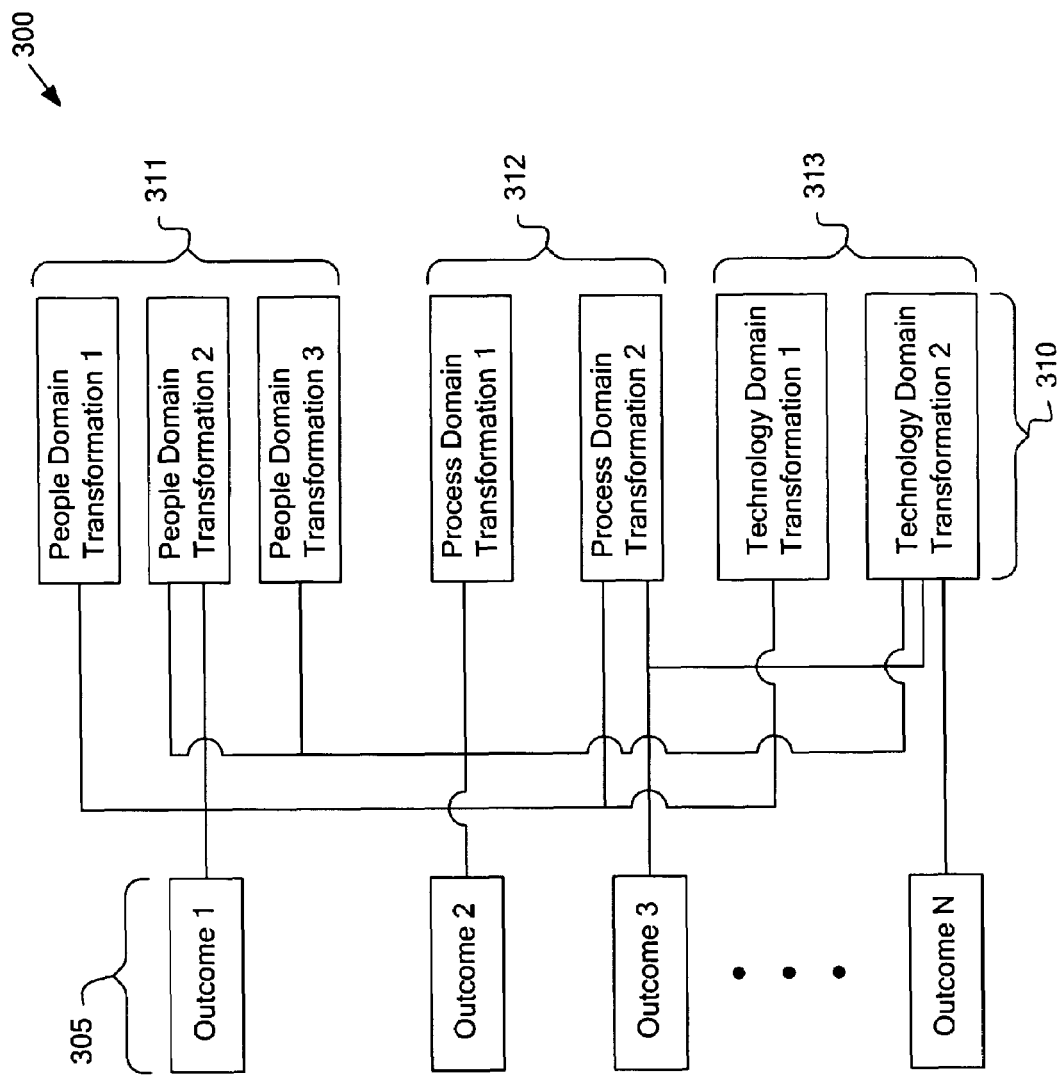
FIG. 3 illustrates a mapping between desired outcomes and element transformation in accordance with one embodiment of the invention.

FIG. 3 illustrates a mapping between desired outcomes and element transformation in accordance with one embodiment of the invention. Outcome/Transformation mapping 300, shown in FIG. 3, includes a number of desired outcomes 305, shown as outcomes 1-N. The outcomes are the result of decomposing high-level goals determined in the envision process 220 described above in reference to FIG. 2. The outcome/transformation mapping 300 also includes transformations 310. The transformations represent a modification to a particular CRM solution element. As shown in FIG. 3, the transformations 310 may be further categorized by the domain, which includes the modified CRM solution element. Transformations 311 represent modification of a CRM solution element from the people domain, while transformations 312 represent modification of a CRM solution element from the process domain, and transformations 313 represent modification of a CRM solution element from the technology domain. Each of the desired out comes is mapped to one or more transformations 310. For example, outcome 1 is mapped to people domain transformation 1, people domain transformation 2, process domain transformation 2, and technology domain transformation 1. The modifications represented, respectively, by the transformation to which an outcome is mapped, represent the required modification to each CRM solution element necessary to effect the desired outcome. For example, at the envision stage it is determined that a valuable and realizable goal is to improve the company marketing program. This goal may then be decomposed into a number of desired outcomes including, for example, the outcome of improving marketing return on investment (ROI). This outcome is then mapped to all of the transformations (modifications to particular CRM solution elements) that are required to attain the desired outcome of improving the marketing program ROI. The mapping of the outcome to the transformation produces a thorough understanding of what is necessary to attain the desired outcome. For one embodiment the desired outcome is mapped to transformation across multiple domains. For example, the desired outcome of improving marketing program ROI may be mapped to a technology domain transformation that includes updating an existing technology. The outcome may also be mapped to a process domain transformation that represents a change in one or more marketing processes due to the implementation of the updated technology. The outcome may further be mapped to two people domain transformations, one of which represents the elimination of several employee positions and the other of which represents a retraining of the employees to facilitate implementation of the updated technology.

Referring again to FIG. 2, the goal of the build and deliver operation 240 is to build, test, and deliver the designs resulting from the design operation 230. The build and deliver operation 240 includes not only the implementation of the technology domain elements of the CRM solution, but also the coordination, management, and deployment of the people domain elements and process domain elements. This includes, for example, training employees to use new technologies, verifying processes, and identifying obsolete technologies, people, and processes.

For one embodiment of the invention, the exit criteria for the build and deliver operation 240 is a thorough testing after initial deployment. Such testing may involve the comparison of actual initial results to expected results and baseline metrics. An associated deliverable may include a determination of resource deficiencies and redundancies.

Post-Delivery Stages

For alternative embodiments of the invention, the CRM solution can be made even more relevant and effective through the addition to the development process of one or more additional stages subsequent to the delivery or implementation of the CRM solution. Such subsequent stages allow the CRM solution developer to confirm and optimize the implemented CRM solution.

Figure 4:
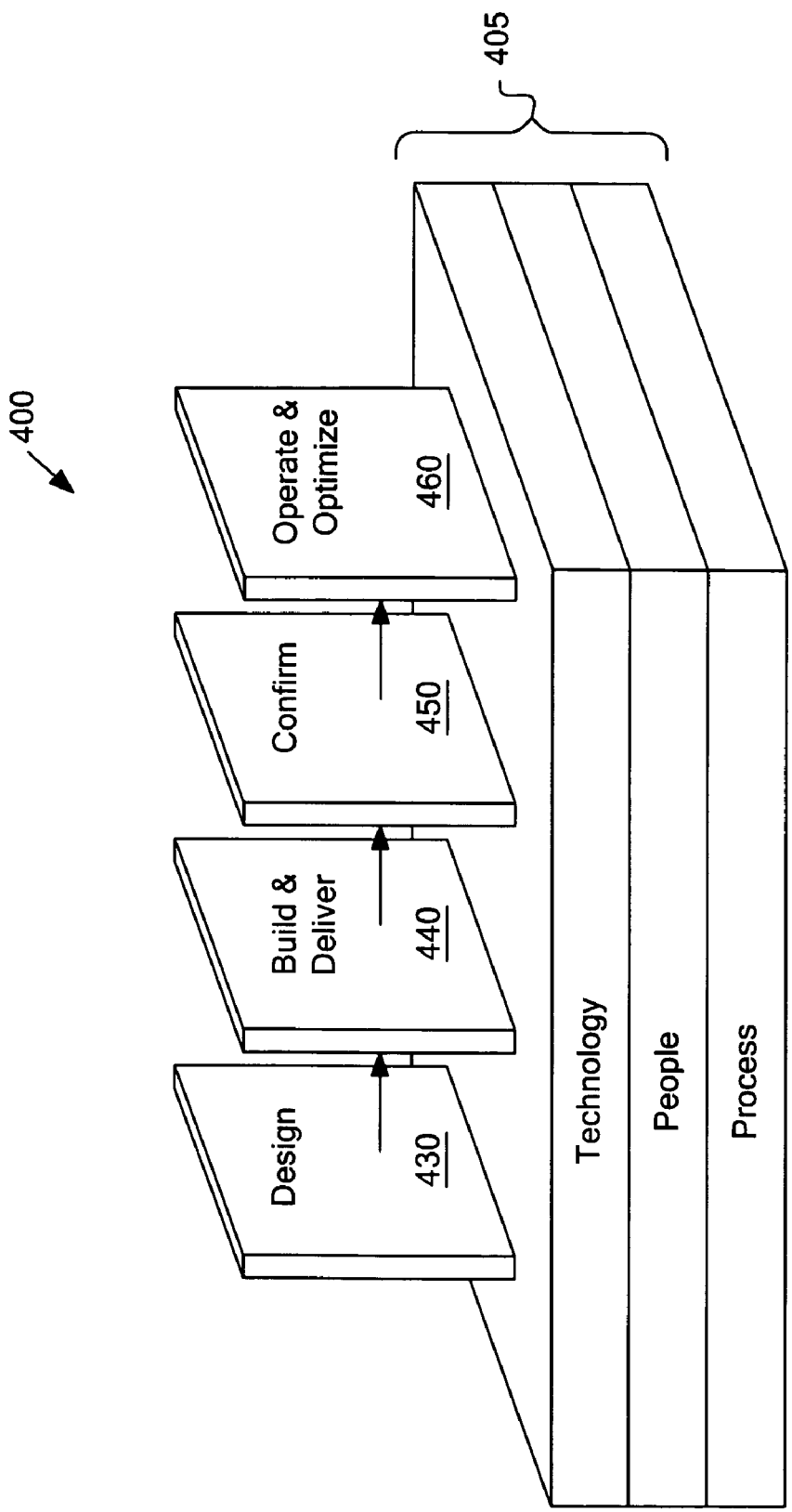
FIG. 4 illustrates a CRM solution development process implementing one or more post-delivery stages in accordance with one embodiment of the invention.

FIG. 4 illustrates a CRM solution development process implementing one or more post-delivery stages in accordance with one embodiment of the invention.

As shown in FIG. 4, the CRM solution development process 400 includes two post-delivery operations, namely confirm operation 450 and operate and optimize operation 460, as well as a design operation 430 and a build and deliver operation 440. Alternative embodiments of the invention may implement only one of the post-delivery operations depending on various factors including the CRM solution budget.

Each operation of a CRM solution development process implementing post-delivery operations may address technology domain elements as well as elements from one or more other domains as exemplified by domain set 405.

The design operation 430 and the build and deliver operation 440 are analogous to operation 230 and operation 240, respectively, as discussed above in reference to FIG. 2.

The post-delivery operations of the CRM solution development process 400 (i.e., confirm operation 450 and operate and optimize operation 460) verify and improve the deployed CRM solution, as more fully discussed below.

The goal of the confirm operation 450 is to verify that the desired outcomes have been attained. The performance of the deployed CRM solution is evaluated in regard to the identified metrics. Any remaining efforts to attain the envisioned future state of the company and any revisions to the envisioned future state of the company are identified. Also, any obstacles to the full implementation of the CRM solution are identified and addressed. For example, it may be beneficial to track user adoption, upon deployment, as resistance may render the CRM solution less effective.

For one embodiment of the invention the confirm operation includes a comprehensive review of all facets of the solution including meetings with end users and key constituents, analyzing relevant operating and financial data, synthesizing performance results and high-level recommendations, and presenting key findings.

The exit criteria of the confirm operation 450 is agreement between the customer company and the CRM solution developer that the desired outcomes have been attained by the deployed CRM solution.

Upon completion of the confirm operation 450, the CRM solution is in-place. The determined transformations across all domains have been implemented and provide the desired outcomes. However, the CRM solution development process, to this point, may have taken several months to complete. During this time changes may have occurred that allow an improvement in the deployed CRM solution. These occurrences provide opportunities for CRM solution optimization.

The goal of the operate and optimize operation 460 is to support and mange the CRM solution to ensure consistent and efficient operation of the CRM solution in regard to the identified metrics while continuing to identify opportunities to optimize the CRM solution to address the evolving needs of the company. For example, technology may be available post-delivery, that was not available during the design stage of the CRM solution development process, or perhaps less expensive or more efficient components become available post delivery. In such cases the costs associated with an optimizing modification are evaluated to determine if the optimization is worthwhile. Or for example, part of the CRM solution development process may have been to develop an exemplary call center and prove the concept. It may then be more cost effective to outsource the operation and maintenance of the call centers. This is an example of an optimization that can be implemented to reduce costs or leverage a developed concept (e.g., efficient call center) in a more scalable way.

Figure 5:
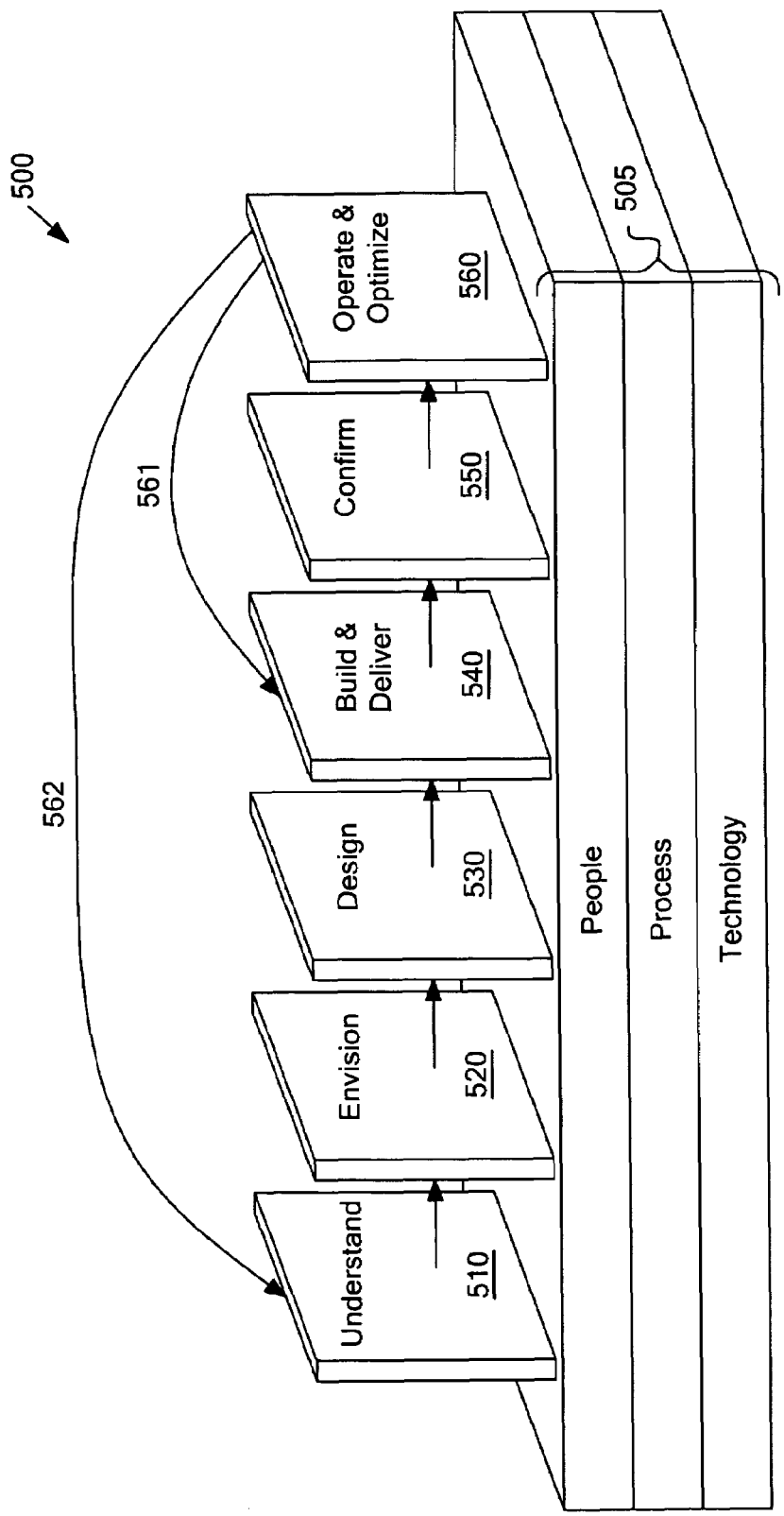
FIG. 5 illustrates a comprehensive 6-stage CRM solution development process concurrently addressing business aspects across multiple domains in accordance with one embodiment of the invention.

FIG. 5 illustrates a comprehensive 6-stage CRM solution development process concurrently addressing business aspects across multiple domains in accordance with one embodiment of the invention. CRM solution development process 500, shown in FIG. 5, includes an understand operation 510, an envision operation 520, a design operation 530, a build and deliver operation 540, a confirm operation 550, and an operate and optimize operation 560.

Each operation of the CRM solution development process 500 may address technology domain elements as well as elements from one or more other domains as exemplified by domain set 505.

Understand operation 510 is analogous to operation 210 as described above in reference to FIG. 2, and may be implemented for one embodiment as an opportunity analysis process. The opportunity analysis process will produce specific findings and recommendations that form the basis for launching initiative.

Figure 6:
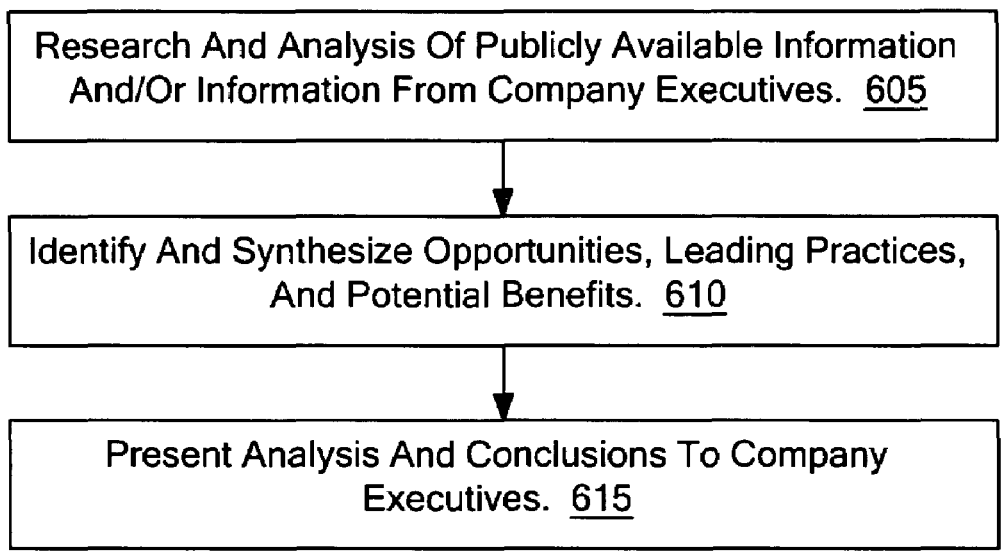
FIG. 6 illustrates an opportunity analysis process that may be used to effect an understanding operation of a CRM development process in accordance with one embodiment of the invention.

FIG. 6 illustrates an opportunity analysis process that may be used to effect an understanding operation of a CRM development process in accordance with one embodiment of the invention. Opportunity analysis process 600, shown in FIG. 6, begins at operation 605 in which research and analysis is conducted to gain an understanding of the company in regard to priorities, obstacles, and expectations. The research and analysis may be based upon publicly available information and/or information from company management and executives.

At operation 610, opportunities, leading practices, and potential benefits identified through the research and analysis of operation 605 are synthesized and validated.

At operation 615 the analysis and key findings are presented to the company executives to assist the customer company in prioritizing initiatives and understanding potential benefits in terms of identified metrics.

Referring again to FIG. 5, envision operation 520 is analogous to operation 220 as described above in reference to FIG. 2, and may be implemented for one embodiment as an executive/management alignment process. Successful initiatives require concurrence from company executives and management regarding desired outcomes, the transformation necessary to attain those outcomes, and the metrics to measure success.

Figure 7:
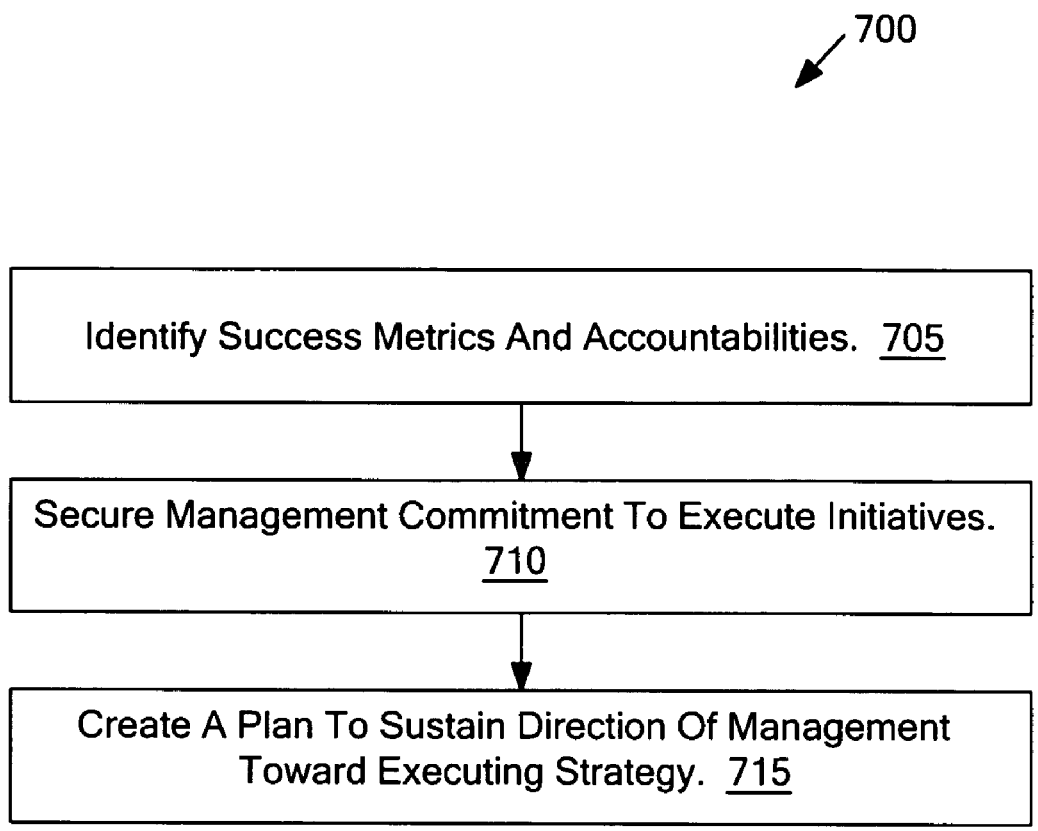
FIG. 7 illustrates an executive/management alignment process that may be used to effect an envision operation of a CRM development process in accordance with one embodiment of the invention.

FIG. 7 illustrates an executive/management alignment process that may be used to effect an envision operation of a CRM development process in accordance with one embodiment of the invention. Executive/management alignment process 700, shown in FIG. 7, begins at operation 705 in which success metrics and accountabilities are identified. The success metrics will be accepted at the functional unit level.

At operation 710 the commitment of all management levels regarding their respective roles in executing the initiatives is secured.

At operation 715 a plan is created to implement sustained change to direct company management toward executing the developed strategy.

Referring again to FIG. 5, design operation 530 and build and deliver operation 540 are analogous to operation 230 and operation 240, respectively, and may be implemented, as described above in reference to FIG. 2.

Confirm operation 550 is analogous to operation 450 as described above in reference to FIG. 4, and may be implemented as performance review process. The performance review process assists the customer company in comprehending the impact of the deployed CRM solution by establishing a framework to measure success overtime, highlighting the behavior of successful end-users, and identifying ways to enhance future performance. The performance review process also identifies opportunities to derive additional value from the CRM solution developer.

Figure 8:
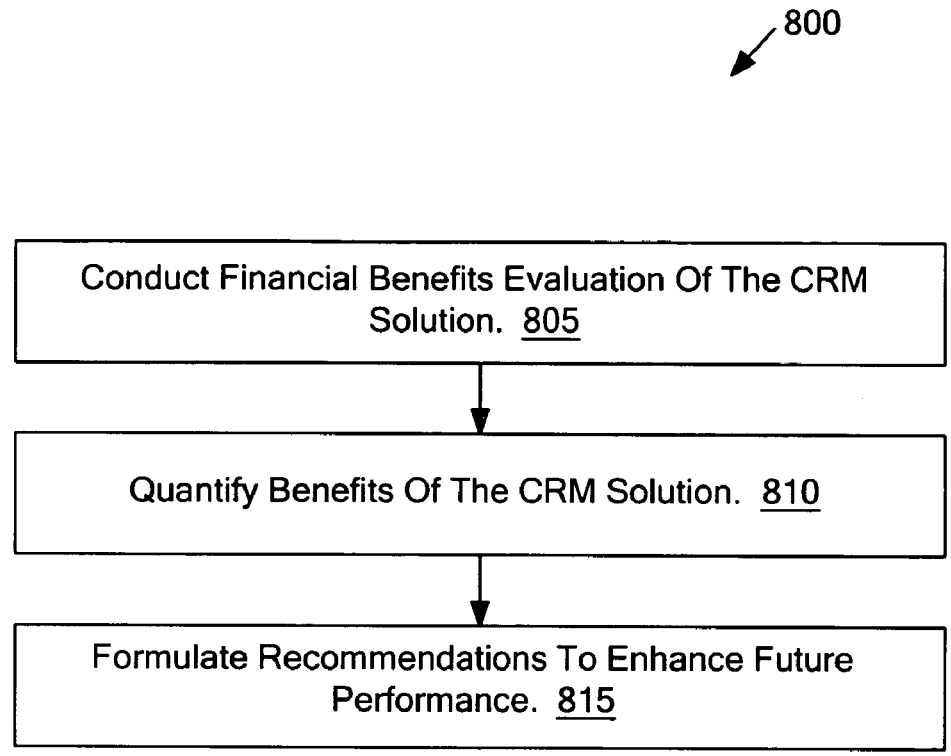
FIG. 8 illustrates a performance review process that may be used to effect a confirm operation of a CRM development process in accordance with one embodiment of the invention.

FIG. 8 illustrates a performance review process that may be used to effect a confirm operation of a CRM development process in accordance with one embodiment of the invention. Performance review process 800, shown in FIG. 8, begins at operation 805 in which a detailed evaluation of the currently deployed CRM solution is conducted. The evaluation is conducted from a financial benefits perspective.

At operation 810 the actual benefits proceeding from the deployed CRM solution are quantified. This quantification may be effected through an analysis of relevant operating and financial data.

At operation 815 recommendations to enhance future performance are formulated. Such recommendations may include a financial quantification and may be based upon a synthesis of performance results.

Referring again to FIG. 5, operate and optimize operation 560 is analogous to operation 460 as described above in reference to FIG. 4, and may be implemented for one embodiment as an application management service which management of the CRM solution to ensure system availability through a cost-effective leveraged solution. Increased ROI depends on cost effective, reliable, availability of the technical infrastructure underlying the CRM solution as well as efficient end-user support to ensure user compliance with the business processes.

An application management service in accordance with one embodiment of the invention meets these criteria by providing end user support and problem management to ensure productivity as well as application infrastructure management to ensure system availability.

The optimization operation may require reiterating one or more previous operations of the CRM solution development process. For example, if, after delivery, a new technology emerges, optimization may entail a reiteration of the design operation of the CRM solution development process as indicated by arrow 561. The point in the process from which a reiteration is commenced is determined by what changes have occurred. For example the occurrence that produces an optimization opportunity may be that a competitor has developed a new process, new technologies have emerged, or the industry at large has changed in some way or a change in factors external to the company (e.g., changes in the economy) has occurred. These changes may be viewed as part of understanding the business need and may require reiteration of the CRM solution development process from the understanding operation as indicated by arrow 562.

A CRM solution development process in accordance with one embodiment of the invention requires communication between the CRM solution developer and the company (e.g., company management and executives). Such communication may involve information processed using a DPS and the communication of information through various communication channels. This communication allows the development of a comprehensive CRM solution having operations in addition to the conventional operations of design and build and deliver operations that concurrently addresses business aspects across the people, process, and technology domains. In one embodiment of the invention, the CRM solution development process constitutes six distinct operations.

A comprehensive CRM solution development process in accordance with one embodiment of the invention, therefore, allows a desired business transformation to be decomposed into one or more applicable CRM solution facets. A desired outcome is then defined for each facet of the desired business transformation. One or more specific actions for effecting each of the desired outcomes is determined. The determined actions are then integrated into a comprehensive CRM solution in which the multiple distinct facets are addressed.

General Matters

Embodiments of the invention provide methods and systems for effecting a comprehensive CRM solution by addressing CRM solution facets across multiple domains. As will be apparent to those skilled in the art, alternative embodiments of the invention are applicable to a wide range of business applications and solutions beyond the realm of customer relationship management.

Likewise, embodiments of the invention have been described in which CRM solutions include several pre-definition stages and/or post-delivery stages each addressing multiple domains. It will be apparent, however, that abbreviated CRM solution development processes may include either one or more pre-design stages or one or more post-development stages addressing only one domain in accordance with alternative embodiments of the invention.

For various alternative embodiments of the invention, one or more operations of the CRM solution development process may be combined into a single operation. For example, the understand operation and the envision operation may be combined for one embodiment. Likewise, an operation as described may be expanded into two or more operations.

One embodiment of the invention provides an industry standard for a CRM solution development process that allows a developer to access the solution requirements and determine how those requirements can be efficiently met. For example, the CRM solution development process may help to associate specific vendors with specific elements of the CRM solution.

Vendors may then be certified against the industry standard to provide consistency in terms of how solution elements are addressed and the content of the associated deliverables. Such certification allows an efficient and effective, fully integrated, CRM solution even where multiple vendors are required to provide the solution.

The invention includes various operations. Many of the methods are described in their most basic form, but operations can be added to or deleted from any of the methods without departing from the basic scope of the invention. For example, embodiments of the invention have been described in which CRM solutions include several pre-definition stages and/or post-delivery stages each addressing multiple domains. It will be apparent, however, that abbreviated CRM solution development processes may include either one or more pre-design stages or one or more post-development stages addressing only one domain in accordance with alternative embodiments of the invention.

In accordance with various alternative embodiments of the invention, some of the operations of the invention may be embodied in machine-executable instructions. Alternatively, the operations may be performed by a combination of hardware and software. Aspects of the invention may be provided as a computer program product that may include a machine-readable medium having stored thereon instructions, which may be used to program a computer (or other electronic devices) to perform a process according to the invention as described above.

Figure 9:
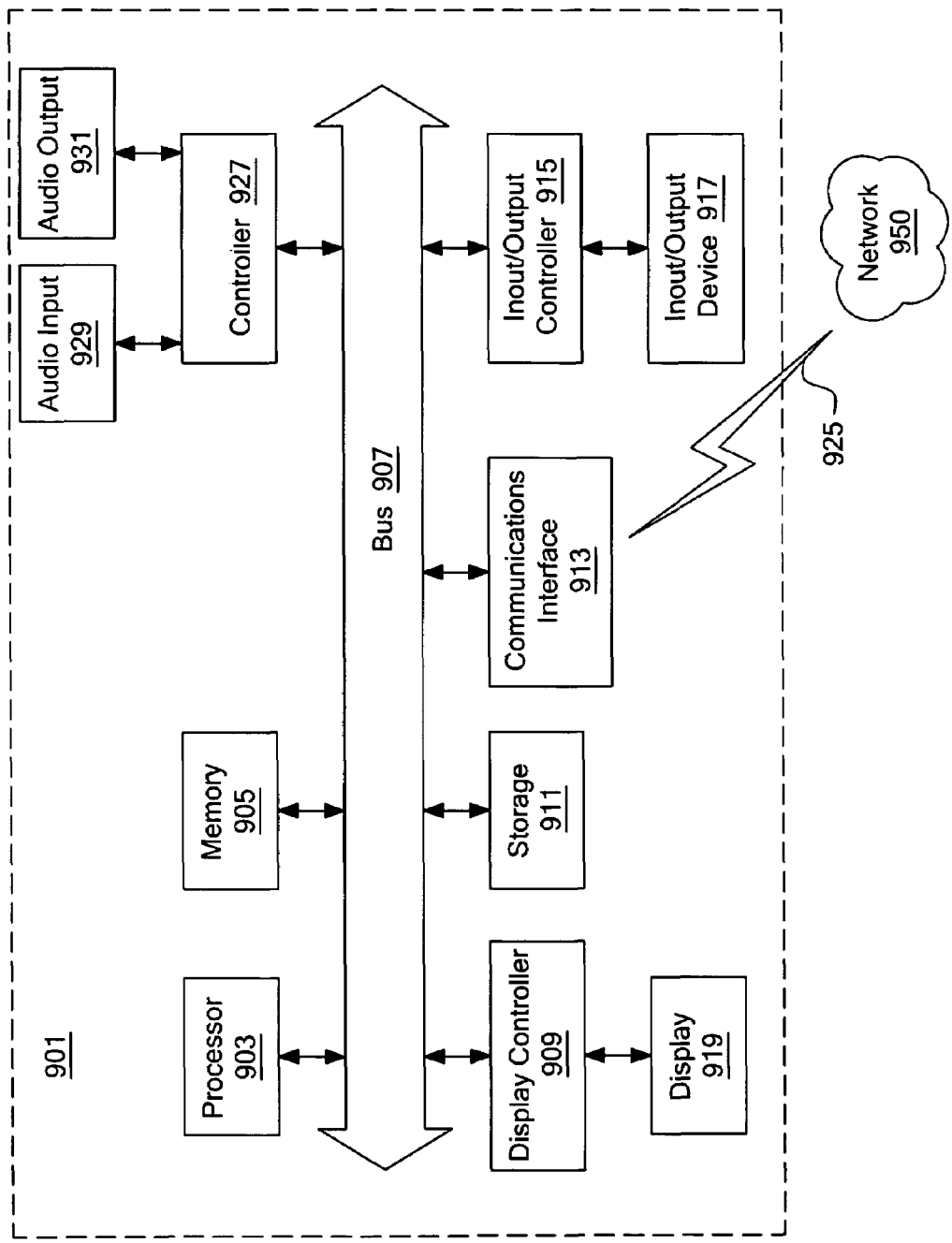
FIG. 9 is a block diagram illustrating one embodiment of a DPS that may be used by customer company representatives or a CRM solution developer in accordance with an embodiment of the present invention.

FIG. 9 is a block diagram illustrating one embodiment of a DPS 901 that may be used by customer company representatives or a CRM solution developer in accordance with an embodiment of the present invention. For alternative embodiments of the present invention, DPS 901 may be a computer that includes a processor 903 coupled to a bus 907. In one embodiment, memory 905, storage 911, display controller 909, communications interface 913, input/output controller 915 and audio controller 927 are also coupled to bus 907.

DPS 901 interfaces to external systems through communications interface 913. Communications interface 913 may include a radio transceiver compatible with wireless telephone signals or other interfaces for coupling a device to other devices. In one embodiment of the present invention, carrier wave signal 925 is received/transmitted between communications interface 913 and network 950. In one embodiment of the present invention, a communications signal 925 may be used to interface DPS 901 with another computer system, a network hub, router or the like. In one embodiment of the present invention, carrier wave signal 925 is considered to be machine readable media, which may be transmitted through wires, cables, optical fibers or through the atmosphere, or the like.

In one embodiment of the present invention, processor 903 may be a conventional microprocessor, such as for example but not limited to an Intel x86 or Pentium family microprocessor, a Motorola family microprocessor, or the like. Memory 905 may be a machine-readable medium such as dynamic random access memory (DRAM) and may include static random access memory (SRAM). Display controller 909 controls in a conventional manner a display 919, which in one embodiment of the invention may be a cathode ray tube (CRT), a liquid crystal display (LCD), an active matrix display, a television monitor or the like. The input/output device 917 coupled to input/output controller 915 may be a keyboard, disk drive, printer, scanner and other input and output devices (e.g., a mouse). In one embodiment of the present invention, audio controller 927 controls in a conventional manner audio output 931 and audio input 929.

Storage 911 may include machine-readable media such as for example but not limited to a magnetic hard disk, a floppy disk, an optical disk, a smart card or another form of storage for data. In one embodiment of the present invention, storage 911 may include removable media, read-only media, readable/writable media or the like. Some of the data may be written by a direct memory access process into memory 905 during execution of software in computer system 901. It is appreciated that software may reside in storage 911, memory 905 or may be transmitted or received via modem or communications interface 913. For the purposes of the specification, the term "machine readable medium" shall be taken to include any medium that is capable of storing data, information or encoding a sequence of instructions for execution by processor 903 to cause processor 903 to perform the methodologies of the present invention. The term "machine readable medium" shall be taken to include, but is not limited to solid-state memories, optical and magnetic disks, carrier wave signals, and the like.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    a digital processing system (DPS) analyzing a plurality of aspects of a business, each aspect corresponding to an element of a particular domain of a set of domains wherein the plurality of aspects corresponds to a set of elements containing elements from at least two domains, wherein the DPS comprises a processor and a memory;
    the DPS determining a modification to the set of elements; and
    the DPS implementing each of the determined modifications to effect a customer relationship management (CRM) solution for the business,
    wherein the DPS determines the modification and effects the CRM solution by:
        providing an industry standard for the set of elements for the CRM solution,
        requiring a plurality of vendors to provide the CRM solution,
        associating each vendor from the plurality of vendors with one or more vendor-specific elements from the set of elements for the CRM solution, wherein each vendor from the plurality of vendors provides at least a portion of the CRM solution encompassing the business's aspects,
        certifying each of the plurality of vendors against the industry standard so as to provide consistency in terms of how the CRM solution-related elements are addressed by the plurality of vendors and in terms of the content of associated deliverables from the plurality of vendors, and
        creating and deploying the CRM solution by integrating vendor-specific portions of the CRM solution.

2. The method of claim 1 wherein the set of domains comprises a people domain, a process domain, and a technology domain.

3. The method of claim 2 wherein the people domain includes elements selected from the group consisting of company hierarchy, management structure, roles, personal values, morale, skills base, training, evaluation, incentives, language and geographic concerns.

4. The method of claim 2 wherein the process domain includes elements selected from the group consisting of process creation and modification, information requirements, effectiveness criteria, regulatory compliance, marketing sales, service partners, and analytics.

5. The method of claim 2 wherein the technology domain includes elements selected from the group consisting of software architecture, integration standards, legacy applications, data quality, data control, and user support.

6. The method of claim 1 further comprising:
the DPS determining one or more metrics relevant to each modification such that the one or more metrics indicate the effectiveness of the CRM solution.

7. The method of claim 6 wherein the one or more metrics are selected from a group consisting of profits, return on investment, total cost of ownership, net margin improvement, net revenue improvement, cash flow improvement, and market share improvement.

8. A machine-readable medium containing executable instructions which when executed by a digital process system cause the system to perform a method comprising:
analyzing a plurality of aspects of a business, each aspect corresponding to an element of a particular domain of a set of domains wherein the plurality of aspects corresponds to a set of elements containing elements from at least two domains; and
selecting a modification of the set of elements from a list of available modifications to attain a desired outcome in regard to the corresponding aspect, such that upon implementation of the each of the selected modifications a customer relationship management (CRM) solution is effected for the business,
wherein selecting the modification includes:
providing an industry standard for the set of elements for the CRM solution,
requiring a plurality of vendors to provide the CRM solution,
associating each vendor from the plurality of vendors with one or more vendor-specific elements from the set of elements for the CRM solution, wherein each vendor from the plurality of vendors provides at least a portion of the CRM solution encompassing the business's aspects,
certifying each of the plurality of vendors against the industry standard so as to provide consistency in terms of how the CRM solution-related elements are addressed by the plurality of vendors and in terms of the content of associated deliverables from the plurality of vendors, and
creating and deploying the CRM solution by integrating vendor-specific portions of the CRM solution.

9. The machine-readable medium of claim 8 wherein the set of domains comprises a people domain, a process domain, and a technology domain.

10. The machine-readable medium of claim 9 wherein the people domain includes elements selected from the group consisting of company hierarchy, management structure, roles, personal values, morale, skills base, training, evaluation, incentives, language and geographic concerns.

11. The machine-readable medium of claim 9 wherein the process domain includes elements selected from the group consisting of process creation and modification, information requirements, effectiveness criteria, regulatory compliance, marketing sales, service partners, and analytics.

12. The machine-readable medium of claim 9 wherein the technology domain includes elements selected from the group consisting of software architecture, integration standards, legacy applications, data quality, data control, and user support.

13. The machine-readable medium of claim 8 wherein the method further comprises:
determining one or more metrics relevant to each modification such that the one or more metrics indicate the effectiveness of the CRM solution.

14. The machine-readable medium of claim 13 wherein the one or more metrics are selected from a group consisting of profits, return on investment, total cost of ownership, net margin improvement, net revenue improvement, cash flow improvement, and market share improvement.

15. A system comprising:
a mapping of each of a set of desired outcomes to one or more business aspect transformations, each desired outcome in respect of an element of a set of elements for a customer relationship management (CRM) solution from a plurality of domains; and
computer system comprising a processor for implementing the one or more business aspect transformations to effect the CRM solution,
wherein the computer system further comprises:
means for providing an industry standard for the set of elements for the CRM solution,
means for requiring a plurality of vendors to provide the CRM solution,
means for associating each vendor from the plurality of vendors with one or more vendor-specific elements from the set of elements for the CRM solution, wherein each vendor from the plurality of vendors provides at least a portion of the CRM solution encompassing the business's aspects,
means for certifying each of the plurality of vendors against the industry standard so as to provide consistency in terms of how the CRM solution-related elements are addressed by the plurality of vendors and in terms of the content of associated deliverables from the plurality of vendors, and
means for creating and deploying the CRM solution by integrating vendor-specific portions of the CRM solution.

16. The system of claim 15 wherein the plurality of domains comprises a people domain, a process domain, and a technology domain.

17. The system of claim 16 wherein the people domain includes elements selected from the group consisting of company hierarchy, management structure, roles, personal values, morale, skills base, training, evaluation, incentives, language and geographic concerns.

18. The system of claim 16 wherein the process domain includes elements selected from the group consisting of process creation and modification, information requirements, effectiveness criteria, regulatory compliance, marketing sales, service partners, and analytics.

19. The system of claim 16 wherein the technology domain includes elements selected from the group consisting of software architecture, integration standards, legacy applications, data quality, data control, and user support.

20. The system of claim 15 further comprising:
means for determining one or more metrics relevant to each business aspect transformation such that the one or more metrics indicate the effectiveness of the CRM solution.

21. The system of claim 20 wherein the one or more metrics are selected from a group consisting of profits, return on investment, total cost of ownership, net margin improvement, net revenue improvement, cash flow improvement, and market share improvement.

22. A method comprising:

a digital processing system (DPS) defining a customer relationship management (CRM) solution addressing one or more elements of each of a plurality of domains, wherein the DPS comprises a processor and a memory;

defining a desired outcome for each element;

the DPS determining one or more specific actions to attain the desired outcomes; and the DPS implementing the specific actions to effect the CRM solution, wherein the DPS determines the one or more specific actions and effects the CRM solution by:

providing an industry standard for the one or more elements for the CRM solution, requiring a plurality of vendors to provide the CRM solution, associating each vendor from the plurality of vendors with one or more vendor-specific elements from the one or more elements for the CRM solution, wherein each vendor from the plurality of vendors provides at least a portion of the CRM solution encompassing the business's aspects, certifying each of the plurality of vendors against the industry standard so as to provide consistency in terms of how the CRM solution-related elements are addressed by the plurality of vendors and in terms of the content of associated deliverables from the plurality of vendors, and creating and deploying the CRM solution by integrating vendor-specific portions of the CRM solution.

23. The method of claim 22 further comprising the antecedent operations of:

analyzing information regarding a company to which the CRM solution pertains; and envisioning a future state of the company such that implementation of the desired outcomes effect the envisioned future state.

24. The method of claim 23 further comprising:

the DPS determining one or more metrics relevant to each desired outcome such that the one or more metrics indicate the effectiveness of the CRM solution.

25. The method of claim 24 wherein the one or more metrics are selected from a group consisting of profits, return on investment, total cost of ownership, net margin improvement, net revenue improvement, cash flow improvement, and market share improvement.

26. The method of claim 22 wherein the plurality of domains comprises a people domain, a process domain, and a technology domain.

27. The method of claim 26 wherein the people domain includes elements selected from the group consisting of company hierarchy, management structure, roles, personal values, morale, skills base, training, evaluation, incentives, language and geographic concerns.

28. The method of claim 26 wherein the process domain includes elements selected from the group consisting of process creation and modification, information requirements, effectiveness criteria, regulatory compliance, marketing sales, service partners, and analytics.

29. The method of claim 26 wherein the technology domain includes elements selected from the group consisting of software architecture, integration standards, legacy applications, data quality, data control, and user support.

30. The method of claim 22 further comprising:

confirming the implementation of the specific actions and a resulting desired outcome; and optimizing the CRM solution.

* * * * *

UNITED STATES PATENT AND TRADEMARK OFFICE
CERTIFICATE OF CORRECTION

| | | |
|---|---|---|
| PATENT NO. | : 7,711,590 B2 | Page 1 of 1 |
| APPLICATION NO. | : 11/026166 | |
| DATED | : May 4, 2010 | |
| INVENTOR(S) | : Keith Andrews et al. | |

It is certified that error appears in the above-identified patent and that said Letters Patent is hereby corrected as shown below:

On the Title page, in Item (75), in column 1, under "Inventors", line 13, delete "Mike Moore," and insert -- Michael Moore, --, therefor.

On Drawing sheet 9 of 9, in Figure 9, line 1, box "915" delete "Inout/Output" and insert -- Input/Output --, therefor.

On Drawing sheet 9 of 9, in Figure 9, line 1, box "917" delete "Inout/Output" and insert -- Input/Output --, therefor.

In column 4, line 11, delete "CPM" and insert -- CRM --, therefor.

Signed and Sealed this
Twelfth Day of April, 2011

David J. Kappos
*Director of the United States Patent and Trademark Office*